Patented June 16, 1942

2,286,343

UNITED STATES PATENT OFFICE 2,286,343

TREATMENT OF HYDROCARBON OILS

Vladimir L. Chechot, Philadelphia, Pa., assignor to The Atlantic Refining Company, Philadelphia, Pa., a corporation of Pennsylvania No Drawing. Application December 9, 1939, Serial No. 308,429

8 Claims. (Cl. 196—40)

The present invention relates to the refining of viscous hydrocarbon oils, and relates more particularly to improvements in the technique of acid treating viscous hydrocarbon oil stocks, whereby economies in acid consumption and recovery are effected, higher yields of treated oil are realized, and difficulties involved in the handling and disposal of acid sludges are obviated.

A principal object of this invention is a process of refining viscous hydrocarbon oils by acid treatment in such manner that the sludge resulting from the treatment is of such character as to be readily pumpable. This invention is particularly adapted in the treatment of viscous oils which normally yield hard, coky, unpumpable sludges when subjected to acid refining. For example, in the production of mineral white oils, wherein the oil stock is heavily treated with fuming sulfuric acid, there is normally produced an acid sludge which is not amenable to pumping. And in the manufacture of viscous lubricating oils by sulfuric acid treatment, hard, coky sludges are frequently encountered.

I have found that such difficulty may be overcome by adding to the oil stock to be treated, a small amount, for example, from about 0.1% to about 1.0% by weight of finely-divided elemental sulfur, and thereafter subjecting the oil containing the suspended or dispersed sulfur to treatment with a sludge-forming agent such as concentrated or fuming sulfuric acid. The sludge resulting from this treatment and comprising tarry matter, oil, sulfur and unreacted acid, is soft or plastic, and is pumpable without difficulty. In fact, in many cases, the sludges produced in accordance with my method of treating are quite liquid. The acid treated oil, upon removal of the sludge associated with the sulfur, may be neutralized with an alkaline agent, such as an aqueous solution of sodium hydroxide or soda ash, and the products of neutralization may be separated from the oil by decantation or other suitable method. If desired, the neutralized oil may be water washed and dried by air blowing, or may be contacted with or filtered through a decolorizing adsorbent such as fuller's earth, bauxite, or the like. The finished oil has a sulfur content substantially no greater than that of the same oil stock which has been acid treated in the absence of added sulfur.

My invention may be further illustrated by the following examples, which, however, are not to be considered as limiting the scope thereof.

(1) To a viscous oil distillate from Russian crude oil, having a Saybolt universal viscosity of 510 seconds at 100° F. and an A. P. I. gravity of 28.8°, was added powdered sulfur in the amount of ¼% by weight of the oil. The sulfur was thoroughly dispersed in the oil by agitation, and the oil containing the dispersed sulfur was subjected to treatment with 5 successive dumps of fuming sulfuric acid (5% by volume of the oil per dump), the acid sludge being settled and removed from the oil after each dump of acid. The sludge from the first acid treatment, instead of being hard, coky and practically unpumpable as in normal treating procedure, was relatively soft, plastic and readily pumpable. The sludges from the remaining four treats were of the same consistency as obtained in normal treating procedure, i. e., semi-fluid and pumpable. The treated oil, after settling and removal of the sludge from the last acid treatment, was neutralized with caustic soda, and extracted with an aqueous solution of alcohol for the removal of the products of neutralization, i. e., salts, alkali, and sodium sulfonates. The neutralized oil was thereafter filtered through granular fuller's earth, and the resulting filtered oil, i. e., mineral white oil, was found to have a sulfur content no greater than that of the same oil stock which was treated as above, but in the absence of added sulfur.

(2) To a lubricating oil distillate from East Texas crude oil, having a Saybolt universal viscosity of 503 seconds at 100° F., and an A. P. I. gravity of 21.4°, was added powdered sulfur in the amount of ½% by weight of the oil. The mixture of oil and sulfur was then agitated with 98% sulfuric acid at a temperature of about 180° F., the amount of acid employed being 5 lbs. per barrel of oil. The resulting acid sludge, very fluid in nature, was separated from the oil, and the oil was then neutralized with caustic soda solution, washed with water, and then dried and brightened by air blowing. The same oil stock, when treated under the same conditions above set forth, but in the absence of added sulfur, produced a thick, coky sludge which was difficult to handle and was practically unpumpable.

My invention is especially adapted to the acid refining of viscous hydrocarbon oils under conditions normally tending to produce hard, coky sludges, and is particularly suitable in the treatment of oil stocks with fuming sulfuric acid at ordinary or elevated temperatures.

What I claim is:

1. The process of acid refining viscous hydrocarbon oil with the production of acid sludge characterized by its ready pumpability, which comprises contacting said oil with sulfuric acid in the presence of an added small amount of finely-divided elemental sulfur, settling the resultant acid sludge, and separating the settled sludge from the oil.

2. The process as recited in claim 1, wherein the amount of finely-divided sulfur employed is from about 0.1% to about 1.0% by weight of the oil.

3. The process as recited in claim 1, wherein the acid employed is fuming sulphuric acid.

4. The process of acid refining viscous hydrocarbon oil with the production of acid sludge characterized by its ready pumpability, which comprises adding to said viscous oil a small quantity of finely-divided elemental sulfur, agitating the mixture of oil and sulfur with sulphuric acid, settling the resultant acid sludge, and separating the settled sludge from the oil.

5. The process of acid refining viscous hydrocarbon oil with the production of acid sludge characterized by its ready pumpability, which comprises adding to said viscous oil a small quantity of finely-divided elemental sulfur, agitating the mixture of oil and sulfur with sulfuric acid, settling the resultant acid sludge, separating the settled sludge from the oil, and neutralizing the treated oil with an alkaline agent.

6. The process of acid refining viscous hydrocarbon oil for the production of mineral white oil with the production of acid sludge characterized by its ready pumpability, which comprises adding to said viscous oil a small quantity of finely-divided elemental sulfur, agitating the mixture of oil and sulfur with fuming sulfuric acid, settling the resultant acid sludge, and separating the settled sludge from the oil.

7. The process of acid refining viscous hydrocarbon oil for the production of mineral white oil with the production of acid sludge characterized by its ready pumpability, which comprises adding to said viscous oil a small quantity of finely-divided elemental sulfur, agitating the mixture of oil and sulfur with fuming sulfuric acid, settling the resultant acid sludge, separating the settled sludge from the oil, neutralizing the treated oil with an alkaline agent, separating from the oil products resulting from said neutralization, and filtering the neutralized oil through a decolorizing adsorbent.

8. In the process of acid refining viscous hydrocarbon oil with the production of acid sludge characterized by its ready pumpability, the step which comprises contacting said oil with sulfuric acid in the presence of an added small amount of finely-divided elemental sulfur.

VLADIMIR L. CHECHOT.